United States Patent [19]
Deitrich et al.

[11] Patent Number: 5,694,885
[45] Date of Patent: Dec. 9, 1997

[54] ANIMAL FEEDER WITH PERCH ASSEMBLY

[75] Inventors: Eric A. Deitrich, Woodbine; John E. Sheaffer, Perryville, both of Md.

[73] Assignee: LAB Products, Inc., Maywood, N.J.

[21] Appl. No.: 542,395

[22] Filed: Oct. 12, 1995

[51] Int. Cl.⁶ .................................................. A01K 5/00
[52] U.S. Cl. ........................................ 119/477; 119/467
[58] Field of Search ............................ 119/477, 464, 119/467, 468, 52.2, 57.8

[56] References Cited

U.S. PATENT DOCUMENTS

| | | | |
|---|---|---|---|
| 2,943,600 | 7/1960 | Rosoff | 119/464 |
| 3,902,459 | 9/1975 | Hunziker, Jr. | 119/464 X |
| 4,104,987 | 8/1978 | Winston | 119/57.8 |
| 4,401,056 | 8/1983 | Cody et al. | 119/477 |
| 4,480,587 | 11/1984 | Sedlacek | 119/419 |
| 4,640,228 | 2/1987 | Sedlacek et al. | 119/419 |
| 4,838,205 | 6/1989 | Larson | 119/52.2 |
| 5,042,429 | 8/1991 | Deitrich et al. | 119/419 |
| 5,372,094 | 12/1994 | Zens | 119/52.2 |

*Primary Examiner*—Gene Mancene
*Assistant Examiner*—Yvonne R. Abbott
*Attorney, Agent, or Firm*—Stroock & Stroock & Lavan LLP

[57] ABSTRACT

An animal feeder that can be mounted on a wall of an animal cage includes a feeder assembly including a back wall, a trough region integrally formed with the back wall and a front wall integrally formed with the trough region and a securing member for securing the feeder asssembly to the wall of the cage. The feeder assembly includes a plurality of slots providing the animal access to a food item placed therein. The animal feeder may include a perch assembly releasably mounted to the feeder assembly. The perch assembly which includes a perch constructed from a plurality of wires, includes a mounting assembly for releasably mounting said perch assembly to said feeder assembly.

18 Claims, 2 Drawing Sheets

ANIMAL FEEDER WITH PERCH ASSEMBLY

BACKGROUND OF THE INVENTION

The present invention relates to animal feeders for use in a shoe box type animal cage and, in particular, to an improved animal feeder that includes a removable perch assembly.

In shoe box type animal cages for small animals, it is desired to maintain a food supply within the cage to reduce the handling of the cage and animals therein. Conventional animal feeders described in U.S. Pat. Nos. 4,480,587 and 4,640,228 include a wire bar lid which extends downward from the top of the cage assembly and essentially reaches the bottom of the cage to provide the animal housed therein with access to the food. However, these type of feeding and watering structures have been less than satisfactory.

Because the wire bar structure that carries the food extends deep within the cage interior, there is a substantial reduction in the visibility of the animals. This reduces the ability of the handler to view the animal housed therein. Secondly, the aforementioned feeding systems suffer from the disadvantage that because the lid provides a roof to the cage with no place to climb, the animal faces a very real possibility of drowning if the watering device within the cage should malfunction and water should pour onto the cage floor, thereby flooding the cage. Moreover, the aforementioned cage feeder requires that the animal squeeze between the cage floor and wire bar lid each time the animal moves from the front of the cage to the rear of the cage. In addition, because the wire bar lid is coextensive with the cage, the wire bar lid must be removed each time a user wishes to gain access to the animals. Lastly, because the food is disposed above the animals, it results in an awkward eating angle for the animal.

Accordingly, it is desired to provide an improved cage feeder construction that provides food to the animal and includes a perch assembly for providing access to a food and/or water source, a safe resting space in the event of a cage flood, improved visibility of the animal housed within the cage and overall increased enjoyment for the animal since the animal can use the perch for resting and climbing upon or leaning against.

SUMMARY OF THE INVENTION

Generally speaking, in accordance with the present invention, an animal feeder for an animal cage is provided. The animal feeder including a feeding assembly having a back wall, a trough region integrally formed with the back wall and a front wall integrally formed with the trough region and a securing member for securing the feeder asssembly to a wall of a cage. The securing member may include flanges adapted to permit the feeder assembly to be mounted on the wall of the animal cage. The animal feeder may also include a plurality of slots providing the animal access to a food item placed therein. The feeder may also include a perch assembly releasably mounted to the feeder assembly and a mounting assembly for releasably mounting the perch assembly to the feeder assembly. The perch on which the animal can rest or eat includes a frame and a plurality of wire bars affixed to the frame. In a preferred embodiment, the mounting assembly includes a wire bar that permits the perch assembly to be releasably mounted to the feeder assembly. Correspondingly, the feeder assembly may include a securing assembly which is affixed to the feeder assembly for releasably securing the mounting assembly of the perch assembly to the feeder assembly. The securing assembly may be either a plate affixed to the feeder assembly and dimensioned to releasably secure and bias the wire bar arms of the mounting assembly between the plate and an underside surface of the feeder assembly or may be a plurality of sleeves also affixed to the feeder assembly and dimensioned to receive the arms of the mounting assembly therein.

Accordingly, it is an object of the present invention to provide an improved animal feeder.

Yet another object of the invention is to provide an animal feeder that includes a perch assembly for providing the animal with a safe resting place in the event of a cage flood.

It is another object of the present invention to provide an animal feeder and perch assembly that provides the animal housed within the cage additional enjoyment by using the perch assembly for climbing upon, leaning against or resting upon.

It is yet a further object of the present invention to provide an animal feeder and perch assembly that provides for increased visibility of the animal housed within the cage assembly.

Still a further object of the present invention is to provide an animal feeder that permits the animal housed within the cage assembly to be removed therefrom without disturbing the animal feeder positioned within the cage assembly.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
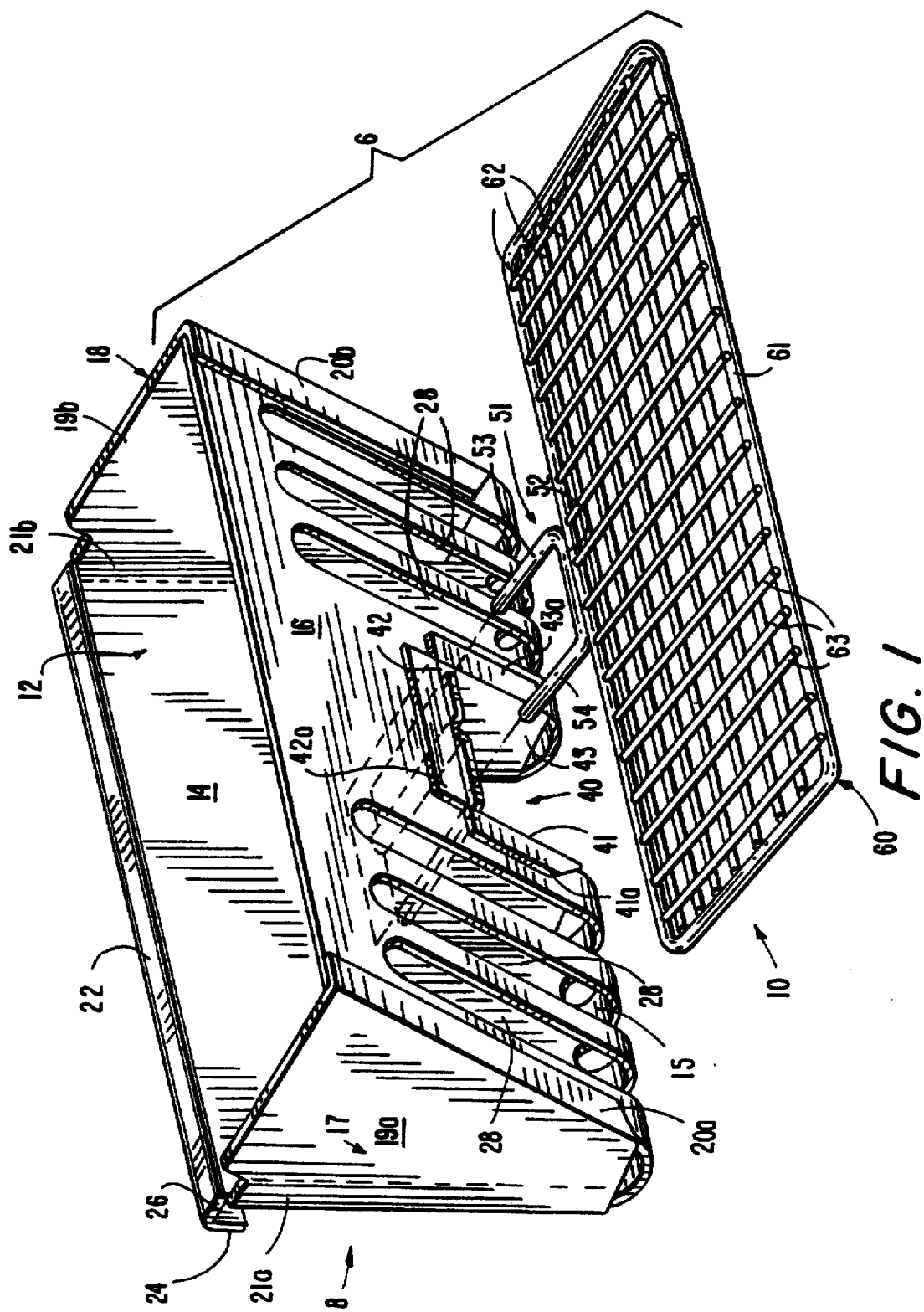
FIG. 1 is an exploded perspective view of a feeder assembly and perch assembly constructed in accordance with the present invention.
Figure 2:
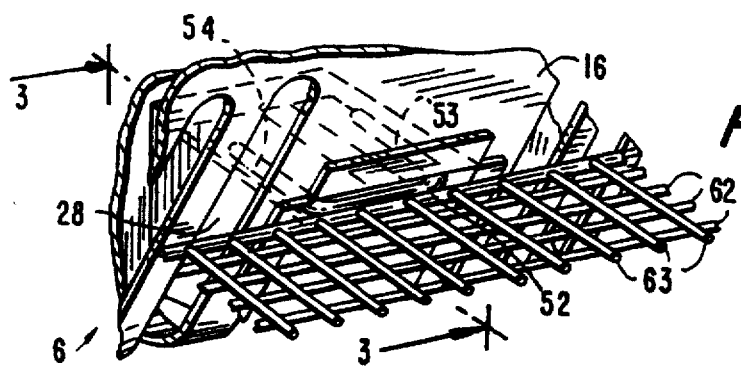
FIG. 2 is a fragmentary perspective view of the feeder assembly and perch assembly, each constructed in accordance with the present invention, illustrating the perch assembly releasably mounted to the feeder assembly.

An example of a cage assembly, with which the present application can be used, is described in U.S. Pat. Nos. 4,480,587 and 4,640,228, each of which is incorporated herein by reference. These typical cage assemblies include a box-like animal cage formed with integral side walls, a bottom floor and an open top end. The walls are preferably formed of a clear plastic such as polycarbonate, which is rigid, durable, permits ready inspection of animals, has a high impact strength, and is machine washable or autoclavable. Such a cage is conventional, commercially available, and widely used. The open top of the cage is bordered by a peripheral lip which typically extends continuously around the side walls.

Reference is now made to FIGS. 1-4 wherein an animal feeder, generally indicated at 6, and constructed in accordance with the present invention, is provided. Animal feeder 6 includes a feeder assembly, generally indicated at 8, and a perch assembly, generally indicated at 10.

Feeder assembly 8 includes a substantially U-shaped trough, generally indicated at 12. Trough 12 includes a back wall 14, an integrally formed trough region 15 and a front wall 16 integrally formed with trough region 15. Trough 12 is U-shaped in an exemplary embodiment, but may be any shape able to hold the food for the animal therein.

Feeder assembly 8 also includes a first side wall, generally indicated at 17, and a second side wall, generally indicated at 18, each of which is affixed to trough 12 as will now be described. Side wall 17 includes a side wall panel 19a and two integrally formed flanges, front flange 20a and rear flange 21a, which extend essentially orthogonally from side wall panel 19a. Front flange 20a is affixed to an edge of front wall 16 preferably by spot welding, glue or the like. Similarly, rear flange 21a is affixed to an edge of back wall 14 by spot welding, glue or the like. Side wall 18 includes a side wall panel 19b, a front flange 20b and a rear flange 21b, each formed integrally with and essentially orthogonal to side wall panel 19b. Flanges 20b and 21b are affixed to the edges of front wall 16 and back wall 14, respectively, in the same manner as and on opposite edges thereof, to flanges 20a and 21a of side wall 17. Side walls 17 and 18 provide for an enclosed feeder assembly 8 on the sides thereof. As depicted in FIG. 1, side walls 17 and 18 may extend above the top rim of back wall 14 so as to further prevent an animal housed within the cage from gaining access to the interior of the feeder.

In a preferred embodiment, trough region 15 is formed with a saddle region 40 which is dimensioned to permit feeder assembly 8 to be positioned over a recessed air and water grommet mounted on a rear wall of the cage as described in U.S. Pat. No. 5,042,429 and also incorporated herein by reference. However, the removal of portions of back wall 14, trough region 15 and front wall 16 to form saddle region 40 may leave apertures in trough region 15 wide enough to permit food items to inadvertently fall out of feeder assembly 8. Accordingly, a plurality of plates 41, 42 and 43 may be provided to prevent food disposed within feeder assembly 8 from inadvertently falling out thereof. Each plate 41, 42 and 43 includes a respective integral and essentially orthogonal depending front flange 41a, 42a and 43a which may be affixed to the respective edges of front wall 16 bordering saddle region 40. Similarly, each plate 41, 42 and 43 includes a respective integral and essentially depending rear flange (not shown) which is affixed to the respective edges of back wall 14 which border cavity 40.

Back wall 14 may include an integrally formed laterally extending flange 22. A downwardly extending flange 24, integral with lateral flange 22, may depend therefrom forming a gap 26 between flange 24 and back wall 14. Gap 26 is dimensioned to be spaced from, encompass and overhang a portion of the lip on the aforementioned conventional cage. In this way, animal feeder 6 may be releasably mounted onto the lip of the conventional cage rim. A typical filter top, such as those described in the aforementioned patents, may be placed over the lip of the conventional cage and therefore over flanges 22 and 24 when animal feeder 6 is mounted on the lip of the cage, in order to provide a cage assembly to house animals, such as laboratory animals.

It is also understood that feeder assembly 8 can be formed as a unitary construction. That is, sides 17 and 18, as well as plates 41, 42 and 43, can be molded integrally with trough 12.

In order for the animal to gain access to the food placed within trough region 15 of feeder assembly 8, trough region 15 and front wall 16 include a plurality of slots 28 defined therein, thereby permitting the animal housed within the cage to gain access to the food placed in the trough assembly.

Perch assembly 10 includes a U-shaped bar, generally indicated at 51, and has a unitary construction. Perch assembly 10 includes a perch 60. In a preferred embodiment, perch 60 includes a unitary frame 61 preferably made from stainless steel wire. A plurality of horizontal wire bars 62 are affixed to a plurality of overlying vertical wire bars 63. The outer edges of each wire bar 62 and 63 are affixed to frame 61 by spot welding, glue or the like to form a wire bar grid array.

A shoulder bar 52 and arms 53 and 54 are formed integrally with and extend orthogonally from shoulder 52. Perch 60 is affixed to shoulder bar 52 of U-shaped bar 51. Perch assembly 10 and the mounting assembly, which includes U-shaped wire bar 51, are preferably made of metal, although other suitable materials may be used.

Figure 3:
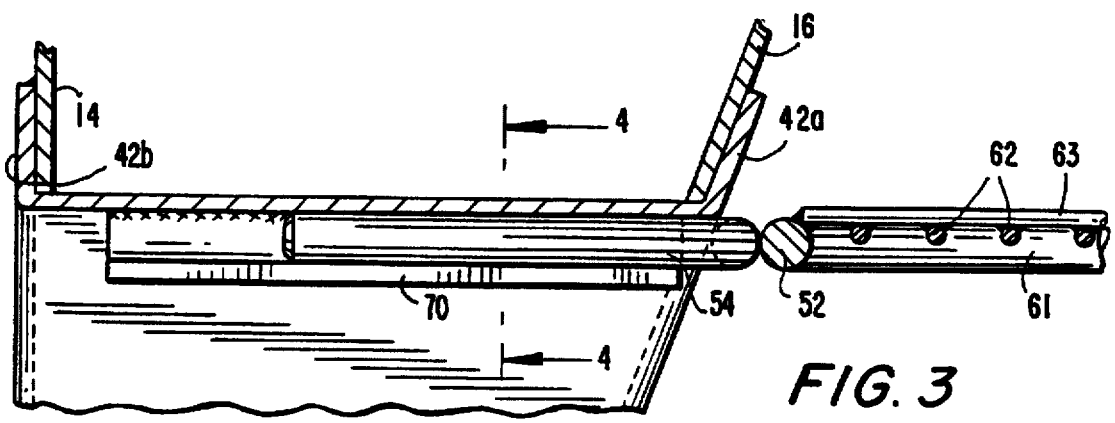
FIG. 3 is a sectional view taken along lines 3—3 of FIG. 2.
Figure 4:
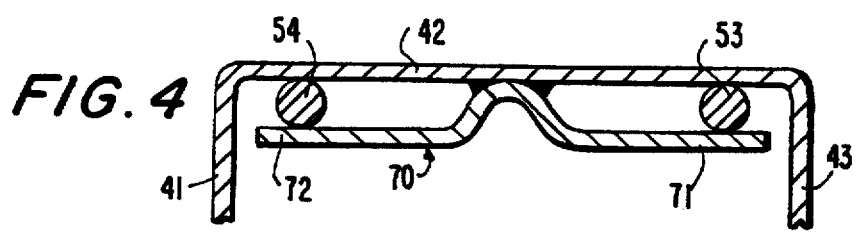
FIG. 4 is a sectional view taken along lines 4—4 of FIG. 3 and illustrating one embodiment for releasably mounting the perch assembly to the feeder assembly.

Reference is now made to FIGS. 3 and 4, which depict a securing assembly, constructed in accordance with one embodiment of the present invention, for releasably securing feeder assembly 8 to perch assembly 10. The securing assembly may include a plate, generally indicated at 70, and affixed to the underside surface of plate 42 in a butterfly arrangement thereby defining integral plate portions 71 and 72 spaced from plate 42. Plate 70 is affixed to the underside surface of plate 42 so that the space between plate portions 71, 72 and plate 42 is less than the outer diameter of arms 53, 54 so that plate portions 71, 72 act as springs biasing arms 53, 54 against plate 42 in a releasable tension fit. In this way perch assembly 10 can be releasably secured to feeder assembly 8, and can be detached therefrom by sliding arms 53 and 54 out from between respective plate portions 71 and 72, during cleaning, for example, and can be easily secured once again to feeder assembly 8 by the insertion of arms 53 and 54 between respective plate portions 71 and 72 of plate 70 and the underside surface of plate 42.

Figure 5:
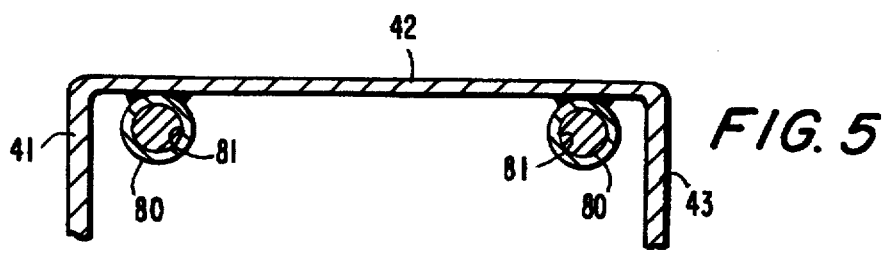
FIG. 5 is a sectional view of a feeder assembly constructed in accordance with an alternative embodiment of the invention.

Reference is now made to FIG. 5 which depicts an alternative embodiment for releasably securing perch assembly 10 to feeder assembly 8. A plurality of sleeves 80 may be provided in lieu of plate 70. Each sleeve may be affixed to the underside surface of plate 42 or to the surfaces of plates 41 and 43 (not shown), respectively. Each sleeve is provided with an elongated bore 81, and dimensioned to respectively receive each arm 53 and 54. Each sleeve 80 is of a sufficient length to maintain arm 53 and 54 secured therein and ensure that the weight of the animal which may climb upon perch 60 does not result in arms 53 and 54 inadvertently releasing from each sleeve 80.

In use, feeder assembly 8, with perch assembly 10 releasably secured thereto, can then be mounted onto the lip of any cage side wall as described above. Additionally, if desired, flanges 22 and 24 may be eliminated so that back wall 14 of feeder assembly 10 can be secured directly to a side surface of the cage wall by screws, rivets, adhesives or the like.

Accordingly, by providing an improved animal feeder that includes a perch assembly an animal feeder that provides the animal with a safe resting place in the event of a cage flood is provided. By providing an animal feeder that includes a perch assembly an animal housed within the cage can enjoy using the perch assembly for climbing upon, leaning against or resting upon. In addition, by providing an animal feeder that includes a perch assembly, a cage assembly can be provided in which the animal housed within the cage assembly can be more easily viewed and be provided with increased room within which to move about. Lastly, by providing an animal feeder that includes a perch assembly the animal housed within the cage assembly can be removed without disturbing the animal feeder positioned within the cage assembly.

It will thus be seen that the objects set forth above, among those made apparent from the preceding description, are efficiently attained and, since certain changes may be made in the above construction with departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An animal feeder for an animal cage, said animal feeder comprising:
    a feeder assembly including a trough having a back wall, a trough region defined by said back wall and a front wall, and a securing member for securing said feeder assembly to a wall of a cage, said feeder assembly including a perch assembly releasably mounted to said feeder assembly and a securing assembly for releasably securing said perch assembly to said feeder assembly, said securing assembly being dimensioned to receive said perch assembly, said perch assembly including a U-shaped bar including a shoulder bar and two integral and essentially orthogonally extending arms; and
    said securing assembly including a plate affixed to said feeder assembly, said arms of said perch assembly being secured between said plate and said trough region.

2. The animal feeder as claimed in claim 1, wherein said securing member includes a flange assembly, said flange assembly including a lateral flange integral with said back wall and a depending flange depending from and integral with said lateral flange, whereby said flange assembly is adapted to permit said feeder assembly to be mounted on a wall of an animal cage.

3. The animal feeder as claimed in claim 1, wherein said trough is constructed to define a plurality of slots, said slots providing an animal access to a food item placed within said trough.

4. The animal feeder as claimed in claim 1, and including a perch assembly releasably mounted to said feeder assembly.

5. The animal feeder as claimed in claim 1, wherein said perch assembly includes a mounting assembly for releasably mounting said perch assembly to said feeder assembly.

6. The animal feeder as claimed in claim 5, wherein said perch assembly further includes a perch comprising a frame and a plurality of wire bars affixed to said frame.

7. An animal feeder for an animal cage, said animal feeder comprising:
    a feeder assembly including a trough portion, said trough portion being adapted to contain food and provide access to a food item placed therein by an animal;
    a perch assembly releasably mounted to said feeder assembly, said perch assembly including a mounting assembly for releasably mounting said perch assembly to said feeder assembly;
    said mounting assembly including a U-shaped bar including a shoulder bar and two integral and essentially orthogonally extending arms; and
    said feeder assembly including a plate affixed to said trough portion, said arms of said mounting assembly being secured between said plate and said trough portion.

8. The feeder as claimed in claim 7, wherein said plate forms a butterfly construction.

9. The animal feeder as claimed in claim 7, wherein said perch assembly further includes a perch comprising a frame and a plurality of wire bars affixed to said frame.

10. The animal feeder as claimed in claim 9, wherein said plurality of wire bars form a grid array.

11. The animal feeder as claimed in claim 7, wherein said securing assembly is dimensioned to receive said mounting assembly of said perch assembly.

12. An animal feeder for an animal cage, said animal feeder comprising:
    a feeder assembly including a trough portion, said trough portion being adapted to contain food and provide access to a food item placed therein by an animal;
    a perch assembly releasably mounted to said feeder assembly, said perch assembly including a mounting assembly for releasably mounting said perch assembly to said feeder assembly;
    said feeder assembly including a securing assembly for releasably securing said perch assembly to said feeder assembly; and
    said mounting assembly including arms, said securing assembly includes a plurality of sleeves affixed to said feeder assembly and dimensioned to receive said arms of said mounting assembly therein for releasably securing said perch assembly to said feeder assembly.

13. An animal feeder for an animal cage, said animal feeder comprising:
    a feeder assembly including a trough portion being adapted to contain food and provide access to a food item placed therein by an animal;
    a perch assembly releasably mountable to said feeder assembly, said perch assembly including a mounting assembly for releasably mounting said perch assembly to said feeder assembly;
    a securing assembly affixed to said feeder assembly for releasably securing said mounting assembly of said perch assembly to said feeder assembly, and
    said securing assembly includes a plate affixed to said feeder assembly dimensioned to releasably secure and bias said arms of said mounting assembly between said plate and a underside surface of said feeder assembly.

14. The animal feeder as claimed in claim 13, wherein said perch assembly further includes a perch comprising a frame and a plurality of wire bars affixed to said frame.

15. The animal feeder as claimed in claim 13, wherein said mounting assembly includes a U-shaped bar including a shoulder bar and two integral and essentially orthogonally extending arms.

16. The animal feeder as claimed in claim 13, said feeder assembly includes a trough having a back wall, a trough region integrally formed with said back wall and a front wall integrally formed with said trough region, said feeder assembly further including flange assembly, said flange means including a lateral flange integral with said back wall and a depending flange depending from and integral with said lateral flange, whereby said flange assembly is adapted to permit said feeder assembly to be mounted on a side wall of an animal cage.

17. The animal feeder as claimed in claim 16, wherein said trough is constructed to define a plurality of slots, said slots providing an animal access to a food item placed within said trough, said perch assembly being constructed to permit access by an animal to said food item while an animal is positioned on said perch assembly.

18. An animal feeder for an animal cage, said animal feeder comprising:

a feeder assembly including a trough portion being adapted to contain food and provide access to a food item placed therein by an animal;

a perch assembly releasably mountable to said feeder assembly, said perch assembly including a mounting assembly for releasably mounting said perch assembly to said feeder assembly;

a securing assembly affixed to said feeder assembly for releasably securing said mounting assembly of said perch assembly to said feeder assembly, and said securing assembly includes a plurality of sleeves affixed to said feeder assembly and dimensioned to receive said arms of said mounting assembly therein for releasably securing said perch assembly to said feeder assembly.

* * * * *